United States Patent [19]

Talarmo

[11] Patent Number: 5,517,681
[45] Date of Patent: May 14, 1996

[54] METHOD FOR PREVENTING SUPERIMPOSITION OF TRAFFIC TIME SLOTS IN A RADIO SYSTEM HAVING A PLURALITY OF TRANSMITTING STATIONS

[75] Inventor: Reino Talarmo, Riihimäki, Finland

[73] Assignee: Nokia Telecommunications Oy, Espoo, Finland

[21] Appl. No.: 244,997

[22] PCT Filed: Oct. 14, 1993

[86] PCT No.: PCT/FI93/00420

§ 371 Date: Jun. 20, 1994

§ 102(e) Date: Jun. 20, 1994

[87] PCT Pub. No.: WO94/09597

PCT Pub. Date: Apr. 28, 1994

[30] Foreign Application Priority Data

Oct. 19, 1992 [FI] Finland ..................... 924728

[51] Int. Cl.⁶ ..................... H04B 1/00; H04J 3/16
[52] U.S. Cl. ..................... 455/54.1; 455/33.1; 455/34.1; 455/34.2; 455/56.1; 370/95.1; 370/95.3
[58] Field of Search ..................... 455/33.1, 34.1, 455/34.2, 54.1, 56.1, 38.1, 53.1, 54.2; 370/95.1, 95.2, 95.3, 85.1, 85.2, 85.3, 110

[56] References Cited

U.S. PATENT DOCUMENTS

| | | | |
|---|---|---|---|
| 5,008,883 | 4/1991 | Eizenhofer et al. | 370/95.1 |
| 5,012,469 | 4/1991 | Sardano | 370/95.3 |
| 5,081,704 | 1/1992 | Umeda et al. | 455/33.1 |
| 5,166,929 | 11/1992 | Lo | 370/85.3 |
| 5,197,125 | 3/1993 | Engel et al. | 345/200 |
| 5,239,677 | 7/1991 | Jasinski | 455/34.1 |
| 5,301,194 | 4/1994 | Seta | 370/95.1 |

FOREIGN PATENT DOCUMENTS 2260877  4/1993  United Kingdom .

OTHER PUBLICATIONS

MPT 1327 "A Signalling Standard for Trunked Land Mobile Radio Systems" Chapter 7 (pp. 7–1 to 7–10) 1991, Radiocommunications Agency—London.
Communication Systems: Towards Global Integration Singapore ICCS '90. Conference Proceedings p. 9–3/1–5 vol. Performance Improvements in Qing Guo; Godlewski, p. 1990.
Tanenbaum, A. S., *Computer Networks*, 1981, pp. 249–323.

*Primary Examiner*—Reinhard J. Eisenzopf
*Assistant Examiner*—Lee Nguyen
*Attorney, Agent, or Firm*—Cushman Darby & Cushman

[57] ABSTRACT

A random access method in a radio system having a plurality of radio stations and at least one base station serving the radio stations, in which the base station transmits an invoking message to the radio stations in a first time slot to grant the radio stations the right to send a random access message to the base station. One of the radio stations transmits a random access message containing a random identifier to the base station in a second time slot subsequent to the first time slot. The base station transmits a response message containing the random identifier to the radio station in a third time slot subsequent to the second time slot. In order to avoid allocating the same telecommunications resource for simultaneous use by more than one of the radio stations, the response message sent by the base station to the radio station in the third time slot contains the identifier of the second time slot.

2 Claims, 3 Drawing Sheets

METHOD FOR PREVENTING SUPERIMPOSITION OF TRAFFIC TIME SLOTS IN A RADIO SYSTEM HAVING A PLURALITY OF TRANSMITTING STATIONS

BACKGROUND OF THE INVENTION

The invention relates to a random access method in a radio system comprising a plurality of radio stations and at least one base station serving said radio stations, in which method the base station transmits an invoking message to the radio stations in a first time slot to grant the radio stations the right to send a random access message to the base station, one of the radio stations transmits a random access message containing a random identifier to the base station in a second time slot subsequent to the first time slot, the base station transmits a response message containing the random identifier to said radio station in a third time slot subsequent to the second time slot.

It is generally known to use a random access method in the implementation of control channel operation, in connection with the registration of a radio telephone in a network, and in call establishment. By means of the random access method a radio telephone, typically a mobile radio, connected via a radio path to a base station and thus to a radio telephone network, informs the base station that it wishes to use the signalling capacity of the system. A radio telephone needs signalling capacity in order to be able to use a speech channel or to send for instance messages, such as short messages.

A typical random access method currently used is the so-called slotted Aloha method, which is described in Computer Networks by A. S. Tanenbaum, 1981, Prentice Hall, Englewood Cliffs, pp. 249–323, particularly pp. 253–257. The use of the slotted Aloha method in connection with modern radio systems is described more closely in the standard MPT 1327, 1991, "A Signalling Standard for Trunked Land Mobile Radio Systems", Radiocommunications Agency, London, Chapter 1.3.3 and particularly Chapter 7. The slotted Aloha method is a random access method in which a radio telephone can attempt access to the control channel only within accurately defined time slots. The control channel is a radio channel or a time divided part of a radio channel used by a base station for call establishment in radio communication between it and mobile stations, i.e. radio telephones and other radio equipment. Typically, a base station transmits repeatedly—although at intervals it has defined, and irregularly if necessary— call attempt invocations, i.e. invoking messages, to radio telephones within the coverage area of its own transmitter. By means of the invoking message it has sent, the base station defines one or typically several time slots for all or a given part of the radios for random access, i.e. for the transmission of the first communication message. The radio which attempts access, i.e. which tries to establish a radio connection with the base station, selects at least one time slot for its random access message according to a rule, and transmits a random access message in that time slot, i.e. random access time slot. The random access message contains at least data for the identification of the radio which attempts access or its user. This identification data may be an address which uniquely identifies either the radio equipment or its user.

Modern radio systems must, however, be prepared for a large number of radio telephones within the area of one base station, and thereby for an extremely high load in the system. The aim is therefore to increase the random access signalling capacity between the base station and the radio equipment. The latest advance in this respect is to shorten the random access message by deleting the address which uniquely identifies the user. Even in this case, however, it is advantageous to distinguish the radio telephones attempting access in some way from each other. The address uniquely identifying the user has therefore been replaced by a random number, a random audio frequency AF, or by sending a random access message on a discrete frequency other than the nominal radio frequency. In cases like this, the (real) address data uniquely identifying the radio telephone is not sent to the base station until during subsequent signalling.

It is also known to use a short, call-specific identifier on a radio path during signalling traffic used for establishing call connection and during call connection. The base station gives the identifier to the radio telephone for the establishment of a certain call and for the identification of the signalling traffic relating to the call.

If the address uniquely identifying the user, i.e. the radio telephone, is replaced in a random access message by a random number, a random frequency or by sending the random access message on a discrete frequency other than the nominal radio frequency, it may cause the following problem. As the identification of radio telephones is effected by means of a random identifier, there is always The risk that two or more radios use the same random identifier, random number or some other corresponding signal in their access attempts, and the base station does not observe this; the call-specific identifier is then allocated to more than one radio telephones. This results at least in collisions between messages sent by the radios, and the transmitted messages are thus destroyed, especially if digital messages are concerned. The signalling traffic is disturbed and becomes more complicated; it is even possible that more than one radio telephone starts to operate on the same voice channel, whereby calls are cross-connected. One method of solving the problem described above is to lengthen the random word or increase the number of audio frequencies used, but this means that the benefits of the shortness of random access messages are mostly lost.

SUMMARY OF THE INVENTION

The object of the invention is to obviate the problem which is caused when radio telephones accidentally use the same random identifier in their random access messages, which involves the risk that the base station allocates the same logical channel to several radio telephones, wherefore calls or at least the signalling traffic is cross-connected.

The invention provides a new type of random access method in a radio system, the method being characterized in that the response message sent by The base station to the radio station in the third time slot contains the identifier of the second time slot.

The invention is based on the idea that the base station adds the identifier of the time slot during which the radio telephone has sent a random access message to the base station to the response message which it sends to the radio telephone in a time slot subsequent to the transmission of the random access message. In other words, the identification data, e.g. the number, of the random access time slot during which the random access message was sent is added to the response message sent by the base station.

An advantage of the method of the invention is that it reduces the probability that the same telecommunications resource—e.g. a radio channel or a time divided part of it, such as a TDM time slot (TDM=Time Division Multiplexing)—is allocated to several (mobile) radio stations. According to the present inventor's calculations, this probability decreases with a coefficient of 0.3 to 0.1, depending on the number of radio stations attempting access simultaneously, the number of possible random identifiers, and the number of (allocated) random access time slots.

BRIEF DESCRIPTION OF THE DRAWINGS

In the following, the invention will be described in greater detail with reference to the accompanying drawings, in which.

DETAILED DESCRIPTION

Figure 1:
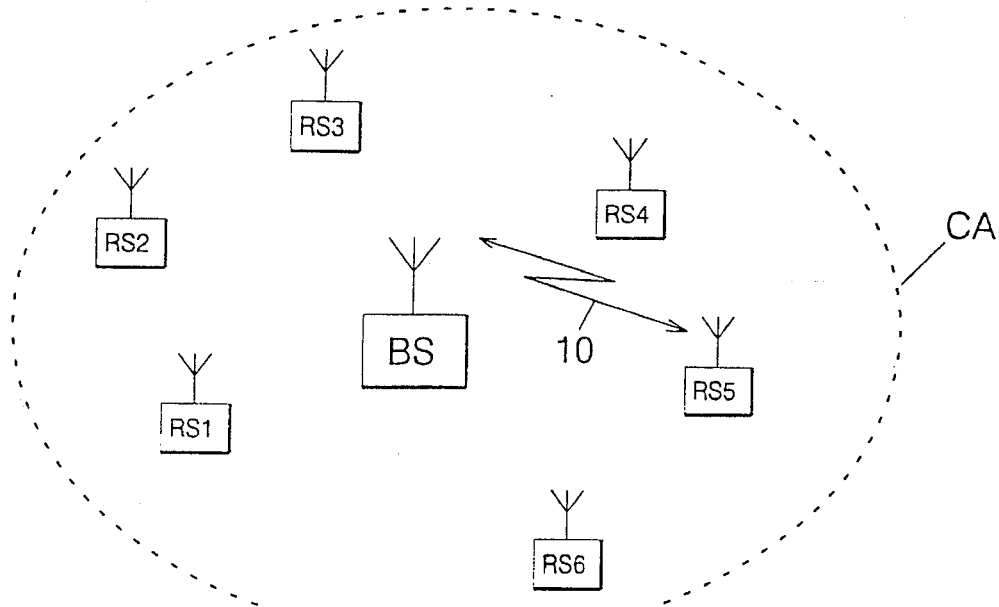
FIG. 1 is a schematic view of a radio system to which the invention is applicable.

FIG. 1 is a schematic view of a radio system to which the invention is applicable. The figure shows a base station BS, which is typically part of a larger cellular radio system or mobile phone network. The base station has a radio link over a radio path 10 to a plurality of radio stations RS1, RS2, RS3, RS4, RS5, RS6, located within the coverage area CA of the base station BS.

Figure 2:
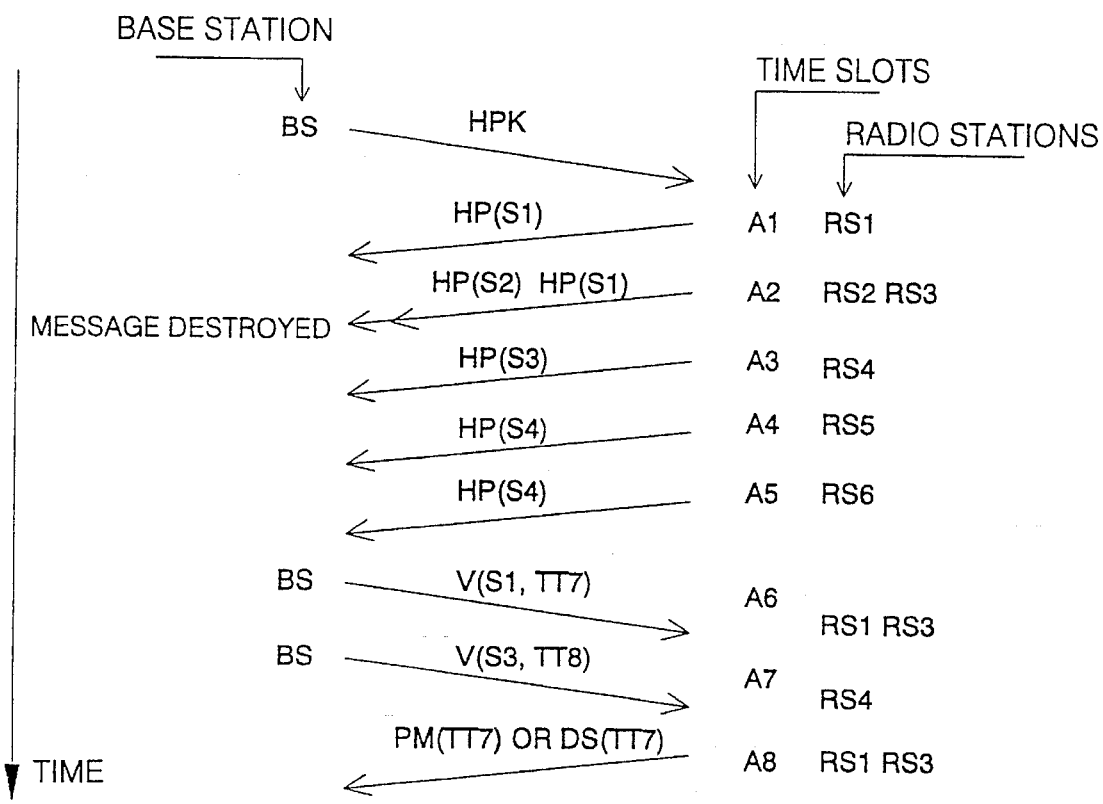
FIG. 2 is a message sequence chart of prior art communication between a base station and a plurality of radio telephones, a random access method being employed in the communication.

FIG. 2 is a message sequence chart of prior art communication between a base station BS and a plurality of radio telephones RS1, RS2, RS3, RS4, RS5, RS6, a random access method being employed in the communication. The base station BS transmits a random access invoking message HPK to radio stations RS1, RS2, RS3, RS4, RS5, RS6, which may be radio telephones or other mobile stations, in a time slot of the radio telephone system. With the random access invoking message HPK the base station BS invokes the radio stations RS1, RS2, RS3, RS4, RS5, RS6 to transmit a random access message HP to the base station BS in a subsequent random access time slot, e.g. A1, A2, A3, A4, A5.

After the radio stations have received the invoking message, one of them—in this case RS1— transmits a random access message HP(S1) to the base station BS in a time slot A1 allowed by the base station BS. The random access message comprises a random identifier S1 selected by the radio station RS1. The random identifier S1 can be, for example, a random number or an audio frequency randomly selected from a certain group; the entire random access message may also function as the random identifier if it is sent on a frequency other than the nominal radio frequency. By means of the random access message the radio station RS1 requests a telecommunications resource, typically a signalling or speech channel, for subsequent commercial communication.

In one of the following time slots (in this case e.g. time slot A2) the radio station RS2 sends a random access message HP(S2) comprising the random identifier S2, and the radio station RS3 sends a random access message HP(S1) comprising the random identifier S1. As both of the radio stations RS2 and RS3 transmit in the same time slot, the messages sent by them are destroyed.

In one of the following time slots (in this case e.g. time slot A3) the radio station RS4 sends a random access message HP(S3) comprising the random identifier S3.

Further, in one of the following time slots (e.g. time slot A4) the radio station RS5 sends a random access message HP(S4) comprising the random identifier S4. Then again in one of the following time slots (e.g. time slot A5) the radio station RS6 sends a random access message HP(S4) comprising the random identifier S4. As can be seen, the random access messages sent by the radio stations RS5 and RS6 have the same random identifier S4.

After the random access time slots A1, A2, A3, A4, A5, the numbers of which are defined by the base station BS, (or if it so wishes, even earlier) the BS sends a response message V(S1, TT7) in one of the following time slots (in this case e.g. time slot A6) to the radio station RS1. In fact, the response message is also sent to the radio station RS3— although the BS does not observe this—as the response message contains the random identifier S1, which was also in the destroyed random access message HP(S1) transmitted by RS3. In the response message the base station BS also transmits an event label TT7, by means of which the BS informs the radio station RS1 of the identifier that the RS1 should use in the communication between the RS1 and the BS from that moment onwards.

In one of the following time slots, e.g. time slot A7, the base station BS transmits a response message V(S3, TT8) comprising the random identifier S3 and the event label TT8 to the radio station RS3.

As the random access messages sent by the radio stations RS5 and RS6 contained the same random identifier S4, and the messages were sent in different time slots, which the base station BS observed, the BS does not send a response message to the radio stations RS5 and RS6. If the BS did send an imaginary response message V(S4, TT9), the radio stations RS5 and RS6 would receive identical response messages, and the same telecommunications resource (e.g. a signalling or speech channel) would thus be allocated to both of them; this would lead to calls being cross-connected.

Finally, in the time slot A8 the radio stations RS1 and RS3 respond to the response message V(S1, TT7) sent by the base station BS by sending, for example, either a call set-up message PM(TT7) or a data message DS(TT7). The messages sent by both RS1 and RS3 contain thus the same event label TT7, given by the BS.

Figure 3:
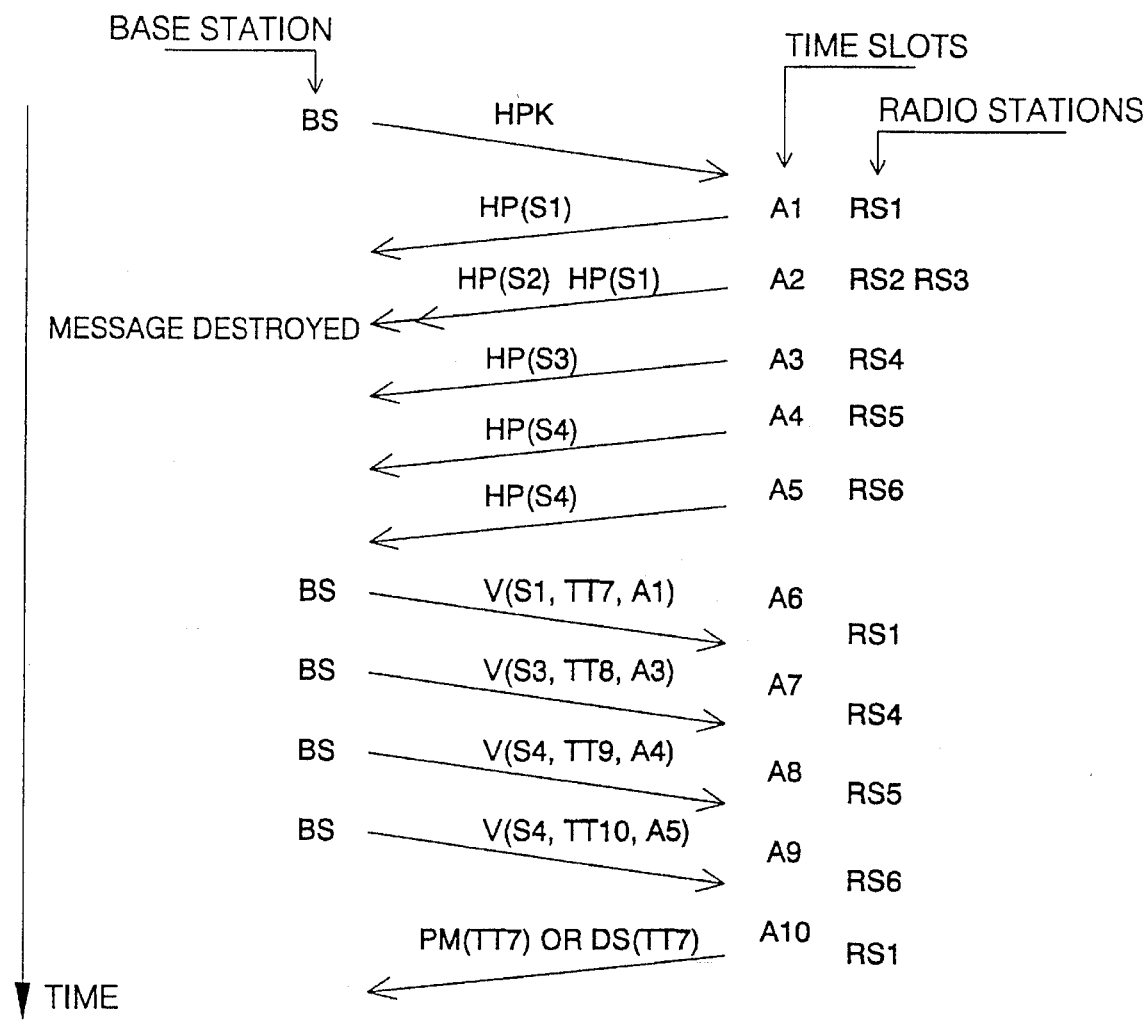
FIG. 3 is a message sequence chart of communication according to the invention between a base station and a plurality of radio telephones, a random access method being employed in the communication.

In a typical random access method of the invention, as shown in FIG. 3, the invoking message HPK transmitted by the base station BS, and the random access messages HP(S1), HP(S2), HP(S3), HP(S4) transmitted by the radio stations RS1, RS2, RS3, RS4, RS5, RS6 are identical with those of the prior art solution illustrated in FIG. 2. However, in the solution of the invention the base station BS adds to each response message it transmits the number of the time slot in which that random access message was sent to which the BS sends the response concerned. Thus the response message V(S1, TT7, A1), transmitted by the base station BS as a response to the random access message HP(S1) sent by RS1 in the time slot A1, contains the identifier A1 of the time slot A1. The identifier of a time slot may be, for instance, the consecutive number of this time slot, calculated from the time slot following the invoking message HPK transmitted by the base station, i.e. A1. The identifier may also be, for example, the identifier of the consecutive number of the time slot in accordance with the frame structure of the entire radio system. The base station may transmit the time slot identifier either in an invoking message or when transmitting synchronization messages to radio stations. In the same way as above, the response message V(S3, TT8, A3), sent by the base station to the radio station RS4, contains the number of the time slot in which that random access message HP(S3) was sent to which the BS sends the response concerned, i.e. the identifier A3. An advantage of the solution according to the invention is that the base station BS does not send any message to the radio station RS3, as the messages transmitted in the time slot A2 are destroyed; the radio station RS3 cannot observe that it has been granted the right to transmit merely on the basis of the random number S1. The risk that the same telecommunications resource (e.g. a signalling or speech channel) would be allocated to both of the radio stations RS1 and RS3 can thus be avoided.

The advantage of the solution according to the invention can be seen in a situation where the radio stations RS5 and RS6 have accidentally selected the same random identifier S4 as the contents of a random access message HP(S4). As stated above, in the solution of the prior art the base station had to ignore such random access messages or the same signalling or speech channel was allocated to several radio stations RS5 and RS6. In the solution of the invention, the base station BS adds to the response messages V(S4, TT9, A4) and V(S4, TT10, A5) sent to the radio stations RS5 and RS6 the identifiers of the time slots A4 and A5, respectively, during which RS5 and RS6 transmitted their random access messages HP(S4); therefore the BS can respond to the random access messages sent by both RS5 and RS6 with response messages, and allocate a telecommunications resource (e.g. a signalling or speech channel) to each of the radio stations.

Figure 4:
FIG. 4 shows a random access message sent by a radio telephone to a base station.

FIG. 4 illustrates a random access message sent by a radio telephone to a base station. The random access message contains a random identifier Sn, which may be a random number, a randomly selected audio frequency, or the entire random access message if it is transmitted on a discrete frequency other than the nominal radio frequency. The random access message may also contain other information in a field possibly reserved for this purpose.

Figure 5:
FIG. 5 shows a response message according to the invention, sent by a base station to a radio telephone.

FIG. 5 illustrates a response message of the invention, transmitted by a base station to a radio telephone. The response message contains a random identifier Sn, which is described in more detail in connection with FIG. 4, and an event label (TTn), by means of which the base station informs the radio station of the identifier it should use from that moment onwards in the communication between the radio station and the base station. In addition, the response message contains a time slot identifier An, which informs the radio station of the time slot during which that random access message was sent to which the BS sends the response concerned. The response message may also contain other information in a field reserved for this purpose. It will be understood by a person skilled in the art that the order of the identifiers or fields can be selected freely in a response message.

Figure 6:
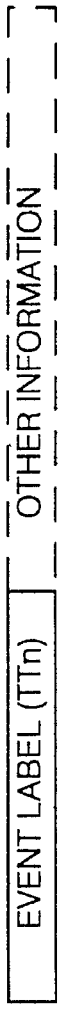
FIG. 6 shows a message sent by a radio telephone to a base station.

FIG. 6 illustrates a message sent by a radio telephone to a base station. The message contains an event label TTn intended for the communication between the radio telephone and the base station, and a field or fields for other information.

The drawings and the associated description are merely intended to illustrate the idea of the invention. In its details the random access method of the invention may vary within the scope of the appended claims. Although the invention has been described above mainly in connection with radio telephone systems, the random access method of the invention can also be utilized in other telecommunication systems.

I claim:

1. A random access method in a radio system comprising a plurality of radio stations and at least one base station serving said radio stations, said method comprising the steps of:

(a) transmitting an invoking message from the base station to the radio stations in a first time slot to grant the radio stations the right to send a random access message to the base station;

(b) transmitting a random access message containing a random identifier from one of the radio stations to the base station in a second time slot subsequent to the first time slot; and (c) transmitting a response message containing the random identifier from the base station to said radio station in a third time slot subsequent to the second time slot, said response message further containing the identifier of said second time slot, which identifier is the consecutive number of said second time slot calculated from the time slot following said invoking message.

2. The method of claim 1, wherein:

in practicing step (a), the base station transmits to the radio stations an identifier of said first time slot, as a part of said invoking message.

\* \* \* \* \*